United States Patent
Junk et al.

(10) Patent No.: US 9,201,416 B2
(45) Date of Patent: Dec. 1, 2015

(54) ASSET DATA MODULES INCLUDING AN INTEGRAL NEAR FIELD COMMUNICATION INTERFACE

(75) Inventors: Kenneth W. Junk, Marshalltown, IA (US); Annette L. Latwesen, Marshalltown, IA (US); Duncan Schleiss, Austin, TX (US); Peter Zornio, Austin, TX (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 791 days.

(21) Appl. No.: 13/357,075

(22) Filed: Jan. 24, 2012

(65) Prior Publication Data

US 2013/0190897 A1 Jul. 25, 2013

(51) Int. Cl.
*G05B 11/01* (2006.01)
*G05B 19/042* (2006.01)
*G05B 19/418* (2006.01)
*H04B 5/00* (2006.01)

(52) U.S. Cl.
CPC ............ *G05B 19/042* (2013.01); *G05B 19/418* (2013.01); *H04B 5/00* (2013.01); *G05B 2219/25107* (2013.01)

(58) Field of Classification Search
CPC ....... G05B 19/042; G05B 19/418; H04B 5/00
USPC ........................................................ 700/12
See application file for complete search history.

(56) References Cited

U.S. PATENT DOCUMENTS

| 2003/0050093 A1* | 3/2003 | Licht .............................. 455/557 |
| 2006/0244565 A1* | 11/2006 | Friedrich et al. ............. 340/10.1 |
| 2007/0108299 A1* | 5/2007 | Donderer ....................... 235/492 |

FOREIGN PATENT DOCUMENTS

| EP | 1785790 A1 | 5/2007 |
| WO | WO-2010094301 A1 | 8/2010 |
| WO | WO 2010094301 A1 * | 8/2010 ......... G05B 19/0423 |

OTHER PUBLICATIONS

International Search Report for International Application No. PCT/US2013/022441 mailed Apr. 18, 2013.
Written Opinion for International Application No. PCT/US2013/022441 mailed Apr. 18, 2013.
International Preliminary Report on Patentability for International application No. PCT/US2013/022441, dated Jul. 29, 2014.
Office Action for Mexican Patent Application No. MX/a/2014/009004 dated May 21, 2015.

* cited by examiner

*Primary Examiner* — Robert Fennema
*Assistant Examiner* — Sivalingam Sivanesan
(74) *Attorney, Agent, or Firm* — Marshall, Gerstein & Borun LLP

(57) ABSTRACT

The present disclosure relates to various assets utilized within manufacturing and process plants for monitoring and control purposes. The asset data modules of the present disclosure include an integral near field communications (NFC) interface configured to provide access to asset data stored within memory integral to the given asset.

28 Claims, 4 Drawing Sheets

ASSET DATA MODULES INCLUDING AN INTEGRAL NEAR FIELD COMMUNICATION INTERFACE

FIELD OF THE INVENTION

The present disclosure relates to assets for use in process and manufacturing plants including an integral radio frequency identification (RFID) module. More specifically, the present disclosure relates to plant assets having a RFID module configured to communicate asset specific information to an associated reader.

BACKGROUND

Near field communications (NFC)-RFID is incorporated in a number of modern day devices. Two of the most common uses of NFC-RFID technology are within credit cards and personal identification badges. When a given credit card is passed close to a corresponding reader, a credit card transaction is processed. Similarly, when a personal identification badge is passed close to a corresponding reader, an unattended entrance gate, or turnstile, permits admission.

RFID involves the hardware known as readers (also known as interrogators), and transponders (also known as tags or labels), as well as RFID software or RFID middleware. Inductively coupled NFC-RFID systems are based on a transformer-type coupling between a primary coil in a reader and a secondary coil in a transponder. Typically, coupling occurs when the distance between the corresponding coils is within approximately 0.16 ft., such that the transponder is located in the near field of the reader's antenna. Electrical energy is transmitted from the reader to the transponder via magnetic coupling between the primary coil in the reader and the secondary coil in the transponder.

RFID can be either passive (using no battery), active (i.e. the transponder has an on-board battery and broadcasts or beacons a signal) or battery assisted passive (BAP) which incorporates a small battery on board that is activated when a transponder is proximate a reader. Some RFID transponders are read from several meters away and beyond the line of sight of the reader. NFC-RFID is related to systems that rely on a transponder being in close proximity to a corresponding reader. When a resonant transponder is placed within the magnetic alternating field of the reader's antenna (i.e. the self-resonant frequency of the transponder corresponds with the transmission frequency of the reader), the transponder draws energy from the magnetic field generated by the reader. This additional power consumption can be measured as voltage drop at the internal resistance in the reader's antenna through the supply current to the reader's antenna. Switching on and off of a load resistance at the transponder's antenna therefore effects voltage changes at the reader's antenna and thus has the effect of an amplitude modulation of the antenna voltage by the remote transponder. When switching on and off of the load resistor is controlled by data, this data can be transferred from the transponder to the reader. This type of data transfer is called load modulation. To reclaim the data in the reader, the voltage measured at the reader's antenna is rectified. This represents the demodulation of an amplitude modulated signal.

Concurrent with the evolution of RFID technology, use of digital field devices in modern manufacturing and processing plants is becoming quite common. Often times, a digital field device forms an integral portion of a given asset. The term "integral" is used herein to mean that the element (i.e. digital field device) is intended to remain fixed to, and remain with a given asset, wherever the given asset may be moved. Assets that are considered to be "repairable" parts are generally more expensive assets that are often times taken out of service, rebuilt and subsequently either stored in a plant warehouse for later use or returned to service. Any given asset may be returned to service in a different area of a plant or placed in service in a different plant all together.

It has become desirable to provide storage of, and access to, corresponding original asset data, asset configuration data, asset historical operations data and asset historical maintenance data that remains with, and forms an integral part of, high value plant assets. It is equally desirable to provide access to, and interaction with, real time asset operating data and diagnostics information. Having access to the asset data even when the given asset is out of service is particularly desirable.

SUMMARY

A communication system for use with a control system of a process plant incorporates at least one process plant asset having an asset data module operatively coupled. The asset data module includes a processor, a memory operatively coupled to the processor and at least one input and at least one output operatively coupled to the memory. The memory is arranged to store original asset data. The memory is further arranged to receive operational data associated with the asset via the input while the asset is in service within the process plant. A control module is stored on the memory and executable by the processor and is arranged to provide a control instruction to the asset and to monitor the operational data. A near field communications interface is included and is configured to retrieve the original asset data and the operational data from the memory. The near field communications interface is further configured to access the original asset data and the operational data whether the asset is in service or out of service. The near field communications interface is configured to communicate with a reader to communicate the original asset data and the operational data to the reader to permit communication of the original asset data and operational data to the control system of the process plant.

An asset data module includes an integral processor having at least one input and at least one output. The processor is configured to execute a process control and/or monitoring routine. The asset data module also includes an integral memory configured to store original asset information for the device and operational data related to the device while the device is in service within a plant process. A near field communications interface is included and is configured to provide access to the original asset information and the operational data stored within the memory. The near field communications interface is further configured to access the data whether the asset data module is in service or out of service.

In another embodiment, an asset data module includes an integral processor having at least one input and at least one output. The asset data module also includes an integral memory having original asset information for the device stored therein. Operational data related to the device is stored in the memory while the device is in service within a plant process. A near field communications interface is incorporated into the asset data module and is configured to provide access to the original asset information and the operational data stored within the memory.

In yet another embodiment, a method of providing data related to an asset data module includes providing an integral processor having at least one input and at least one output, providing an integral memory and storing original asset information for the device and storing operational data related to the device within the memory while the device is in service within a plant process. The method also includes storing a device data access routine within a memory of the asset data module and providing a near field communications interface configured to provide access to the original asset information and the operational data stored within the memory when the device data access routine is executed.

In yet a further embodiment, an asset data module includes an integral processor. The asset data module also includes an integral memory having original asset information for the device stored therein. Operational data related to the device is stored in the memory while the device is in service within a plant process. A near field communications interface is incorporated into the asset data module and is configured to provide access to the original asset information and the operational data stored within the memory.

The features and advantages described in this summary and the following detailed description are not all-inclusive. Many additional features and advantages will be apparent to one of ordinary skill in the art in view of the drawings, specification, and claims hereof.

DETAILED DESCRIPTION OF THE INVENTION

A plant asset includes a radio frequency identification (RFID) module including a near field communication (NFC) interface. When a given asset is new, original asset data, such as: a model number, a serial number, an installation manual, digital photographs of the asset, an asset operations manual, an asset maintenance manual, asset specification sheets, asset drawings, etc. may be stored in a corresponding asset data module. While installing a given asset within a process, configuration data stored in a corresponding asset data module may be automatically communicated with associated asset data modules to simplify installation and reduce errors that may occur due to inaccurate configuration. Once placed in service, the asset data routine is executed by a corresponding processor that causes an asset to store corresponding asset configuration data, an asset operations history and an asset maintenance history, for example, in the asset data module. Additionally, while the given asset is in operation, operational information associated with the process within a process plant with which the given asset is installed and information related to real time asset data and asset diagnostics information is accessible via the NFC interface.

RFID technology uses radio waves to transfer data between a reader and a transponder attached to an asset for the purpose of asset identification and tracking. RFID makes it possible to give each field device in a plant, for example, its own unique identifying number, to provide assets, raw materials, people, work in process, inventory etc. with individual unique identifiers. Furthermore, a passive RFID transponder (transponder without a battery) is read when an RFID reader is passed within close enough proximity. It is not necessary to have the transponder within a line of sight with respect to the reader device. The transponder may be read even when the transponder is contained inside a housing.

Figure 1:
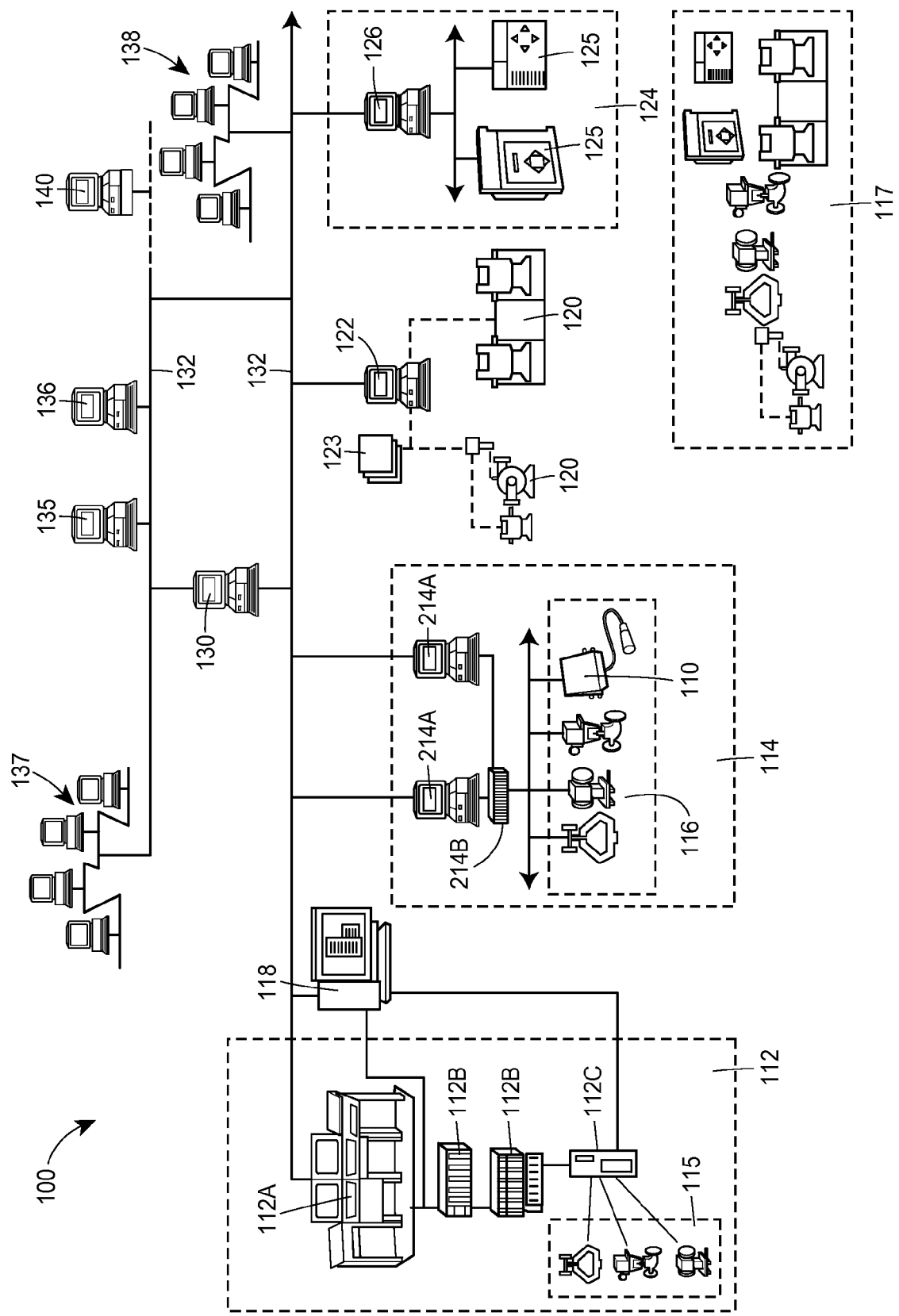
FIG. 1 depicts a block diagram of a plant digital automation system.

Referring now to FIG. 1, a plant digital automation system 100 includes a number of business and other computer systems interconnected with a number of plant control and/or monitoring devices by one or more communication networks. The plant digital automation system 100 includes one or more process control systems 112 and 114. The process control system 112 may be a traditional process control system such as a PROVOX or RS3 system or any other distributed control system (DCS) which includes an operator interface 112A coupled to a controller 112B and to input/output (I/O) cards 112C which, in turn, are coupled to various field devices, such as analog and Highway Addressable Remote Transmitter (HART) field devices 115. The process control system 114, which may be a distributed process control system, includes one or more operator interfaces 114A coupled to one or more distributed controllers 114B via a communications bus, such as an Ethernet bus. The controllers 114B may be, for example, DeltaV® controllers sold by Fisher-Rosemount Systems, Inc. of Austin, Tex. or any other desired type of controllers. The controllers 114B are connected via I/O devices to one or more field devices 116, such as for example, HART or Fieldbus field (FF) devices or any other smart or non-smart field devices including, for example, those that use any of the PROFIBUS®, WORLDFIP®, Device-Net®, AS-Interface and CAN protocols. As is known, the field devices 116 may provide analog or digital information to the controllers 114B related to process variables as well as to other device information. The operator interfaces 114A may store and execute tools available to the process control operator for controlling the operation of the process including, for example, control optimizers, diagnostic experts, neural networks, tuners, etc. Incorporation of a RFID module having a NFC interface within related assets allows plant personnel to access asset data and integrate the asset data into the process control system 112, 114 even when the given asset is out of service.

A computer system 130 is provided which is communicatively connected to the computers or interfaces associated with the various functional systems within the plant digital automation system 100, including the process control systems 112 and 114, the operations and maintenance system computers such as those implemented in the computers 118, 114A, 122 and 126 and the business functions. In particular, the computer system 130 is communicatively connected to the traditional process control system 112 and to the maintenance interface 118 associated with the given control system. The computer system 130 is connected to the process control and/or maintenance interfaces 114A of the distributed process control system 114 and is connected to the rotating equipment maintenance computer 122 and to the power generation and distribution computer 126, all via a bus 132. The bus 132 may use any desired or appropriate local area network (LAN) or wide area network (WAN) protocol to provide communications. Incorporation of a RFID module having a NFC interface into a computer system 130 allows plant personnel to access asset data and integrate the asset data into the computer system 130 even when the given asset is out of service.

As illustrated in FIG. 1, the computer 130 is also connected via the same or a different network bus 132 to business system computers and maintenance planning computers 135 and 136, which may execute, for example, enterprise resource planning (ERP), material resource planning (MRP), computer maintenance management systems (CMMS), accounting, production and customer ordering systems, maintenance planning systems or any other desired business applications such as parts, supplies and raw materials ordering applications, production scheduling applications, etc. The computer 130 may also be connected via, for example, the bus 132, to a plant-wide LAN 137, a corporate WAN 138 as well as to a computer system 140 that enables remote monitoring of, or communication with, the plant 100 from remote locations. Incorporation of a RFID module having a NFC interface allows plant personnel to access asset data and integrate the asset data into the business system computers and maintenance planning computers 135 even when the given asset is out of service.

Still further, operations and maintenance systems, such as computers 118 executing an asset management solutions (AMS) application or any other device monitoring and communication modules may be connected to the process control systems 112 and 114 or to the individual devices 115 therein to perform maintenance and monitoring activities. For example, an operations and maintenance computer 118 may be connected to the controller 112B and/or to the field devices 115 via any desired communication lines or networks (including wireless or handheld device networks) to communicate with and, in some instances, reconfigure or perform other maintenance activities on the field devices 115. Similarly, operations and maintenance applications such as the AMS application may be installed in and executed by one or more of the user interface computers 114A associated with the distributed process control system 114 to perform operations and maintenance monitoring functions, including data collection related to the operating status of the field devices 116. Incorporation of a RFID module having a NFC interface allows plant personnel to access asset data and integrate the asset data into the operations and maintenance computers 118 even when the given asset is out of service.

The plant digital automation system 100 also includes various rotating equipment 120, such as turbines, motors, etc. which are connected to a maintenance computer 122 via a permanent or temporary communication link, such as a bus, a wireless communication system or hand held NFC reader which are connected to the equipment 120 to take readings and are then removed. The maintenance computer 122 may store and execute known monitoring and diagnostic applications 123, for example RBMware® sold by CSI Systems of Knoxville, Tenn. or any other known applications used to diagnose, monitor and optimize the operating state of the rotating equipment 120. Maintenance personnel usually use the applications 123 to maintain and oversee the performance of rotating equipment 120 in the plant 100, to determine problems with the rotating equipment 120 and to determine when and if the rotating equipment 120 must be repaired or replaced. Incorporation of a RFID module having a NFC interface allows plant personnel to access asset data and integrate the asset data into the rotating equipment 120 even when the given asset is out of service.

Similarly, a power generation and distribution system 124 having power generating and distribution equipment 125 associated with the plant digital automation system 100 is connected via, for example, a bus, to another computer 126 which runs and oversees the operation of the power generating and distribution equipment 125 within the plant. The computer 126 may execute known power control and diagnostics applications 127 such as those provided by, for example, Liebert and ASCO or other companies to control and maintain the power generation and distribution equipment 125. Often times, the more expensive and larger field devices, rotary equipment and power generation/distribution units are taken out of service, rebuilt and either placed in a warehouse/materials supplies area for later use or returned to service. It should be understood that the given asset may be put in service in a different area of the plant or in a different plant all together. A near field communications (NFC) reader 110 may be utilized to receive and/or transmit original asset data, configuration data, real time operations data, diagnostics data, historical operations data, historical maintenance data, a sub-combination or combination thereof for any given asset. A NFC reader may be incorporated within a digital valve controller (DVC).

A near field communications (NFC) interface (element 300 of FIG. 3) may be configured to receive and/or transmit data from/to any given asset regardless whether or not the given asset 117 is out of service at the time the data exchange is desired. It should be understood that "out of service" as used herein has its customary meaning, and may, in some applications, have the added meaning that no electric power is attached to the given asset from an external hardwired source. A passive NFC interface may be used in which case not even battery power is provided within the given asset. Utilizing a passive NFC interface, or at least partially passive NFC interface, original asset data, asset configuration data, asset historical operations data and asset historical maintenance data may be stored within a given asset such that the data travels with the asset and is accessible whether the asset is in service or not.

Figure 2:
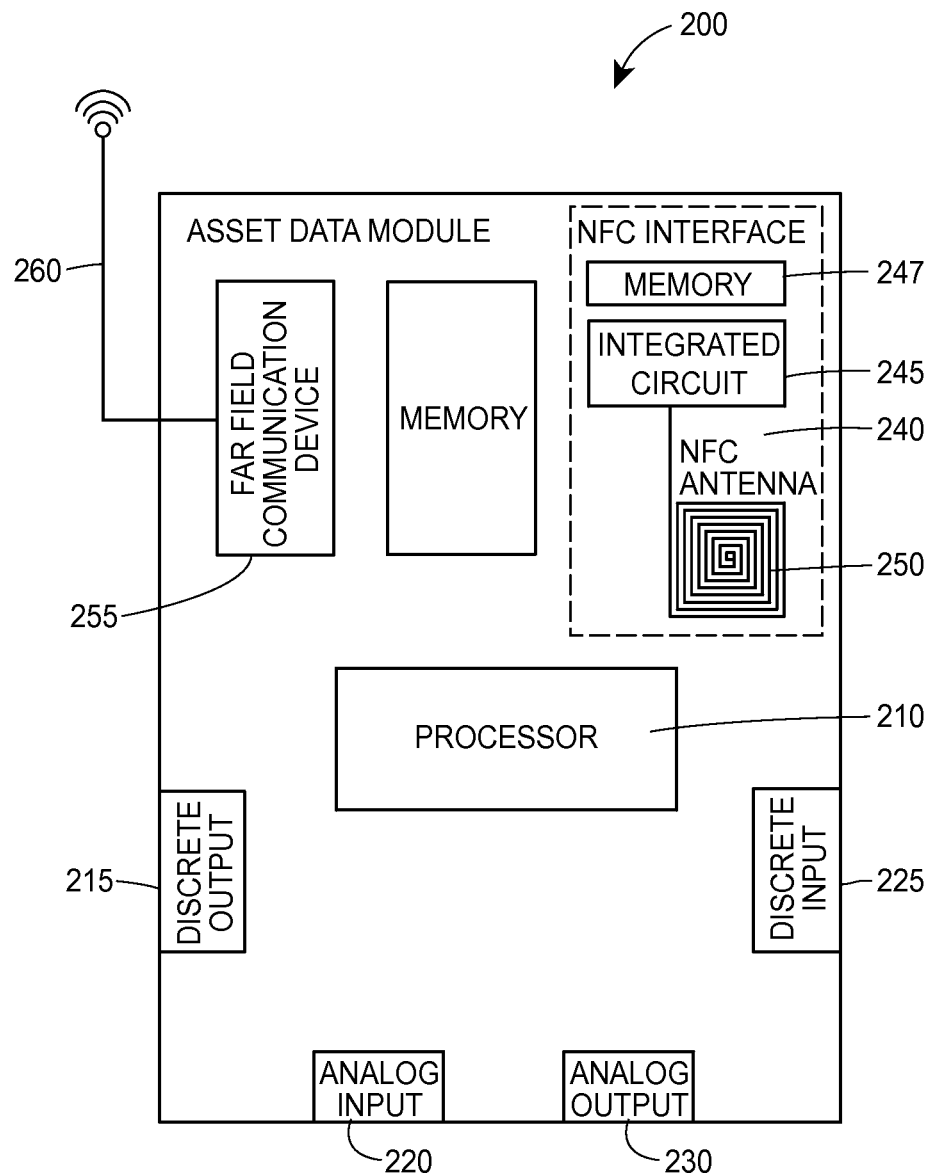
FIG. 2 depicts a block diagram of an asset data module including an integral near field communications or RFID module.

With further reference to FIG. 1 and additional reference to FIG. 2, an asset data module 200 is depicted including an integral near field communications (NFC) interface 240. It should be understood that an asset data module 200 may be formed as an integral part of any given process plant asset 115, 116, 117, 120, 124. The asset data module 200 includes an integral processor 210, a discrete input 215, an analog input 220, a discrete output 225, an analog output 230, an integral memory 235, a far field communications device 255 and a far field communications antenna 260. An asset data module may include an integral processor 210, an integral memory 235 and a NFC interface and configured as a data logger. The NFC interface 240 includes an integrated circuit 245, a NFC interface memory 247 and a NFC antenna 250. Any given asset 115, 116, 117, 120, 124 of the process plant supervisor control and data acquisition system 100 of FIG. 1 may incorporate an asset data module 200. A plurality of process plant assets 115, 116, 117, 120, 124 may be incorporated into a process plant digital automation system 100 with each asset comprising an asset data module 200. Each asset data module 200 including an integral processor 210 configured to receive at least one input 215, 220 and at least one output 225, 230 associated with various plant operations. The integral processor 210 is configured to execute a process control routine and/or a process monitoring routine. The asset data module 200 also includes an integral memory 235, 247 configured to store original asset data, asset configuration data and asset operational data related to the asset while the asset is in service within a process. The asset data module 200 includes a near field communications interface 240 configured to provide access to the original asset data, the asset configuration data and the asset operational data stored within the integral memory 235, 247. An asset data access routine is stored on the integral memory 235 that, when executed on the integral processor 210 provides access to the original asset data, the asset configuration data and the asset operations data. The near field communications interface 240 provides access to the original asset data and the asset operational data whether the asset data module is in service or out of service. A near field communications reader 110 provides access to the original asset data, the asset configuration data and the asset operations data via the near field communications interface 240 and communicates the original asset data and the asset operations data with a process plant digital automation system 100.

A particular advantage of the present disclosed apparatus is with regard to assets installed within areas of a plant designated as being explosive environments. A given asset may be a mechanical valve body, for example. Whether the valve incorporates a linear or rotary mechanism for controlling the associated flow through the valve body, the corresponding valve actuator is often times pneumatic. For example, the valve actuator may be configured such that an increase in applied pneumatic pressure will increase an opening within the valve body, thereby allowing an increase in material flow through the associated valve. Typically, a valve controller is mounted adjacent to the valve body. The valve controller often times incorporates electrically operated solenoids that, when connected to a given valve actuator control the pneumatic pressure applied to the corresponding valve actuator. In order to minimize the length of pneumatic lines extending from the valve controller to the valve actuator, the valve controller is often times mounted on the corresponding valve body. When the assembly (i.e., valve body, valve actuator and valve controller) is installed within an area of a plant that is designated to be an explosive environment, any associated electrical connections are required to be contained within explosion proof enclosures. Incorporating a passive RFID transponder with a valve body having configuration data associated to the valve assembly stored within the transponder results in an assembly suited for installation within an area of a plant designated as being an explosive environment. Incorporating a RFID reader within a corresponding valve controller that is, itself contained within an explosion-proof enclosure allows for communication of the valve configuration data to the valve controller with no external electrical connections extending between the valve controller and the valve body. An additional advantage associated with this combination is that the corresponding assembly may be configured automatically. The valve configuration data is communicated to the valve controller RFID reader from the valve body RFID transponder. The valve controller executes an automatic configuration routine to match the valve controller configuration to the valve configuration data.

Figure 3:
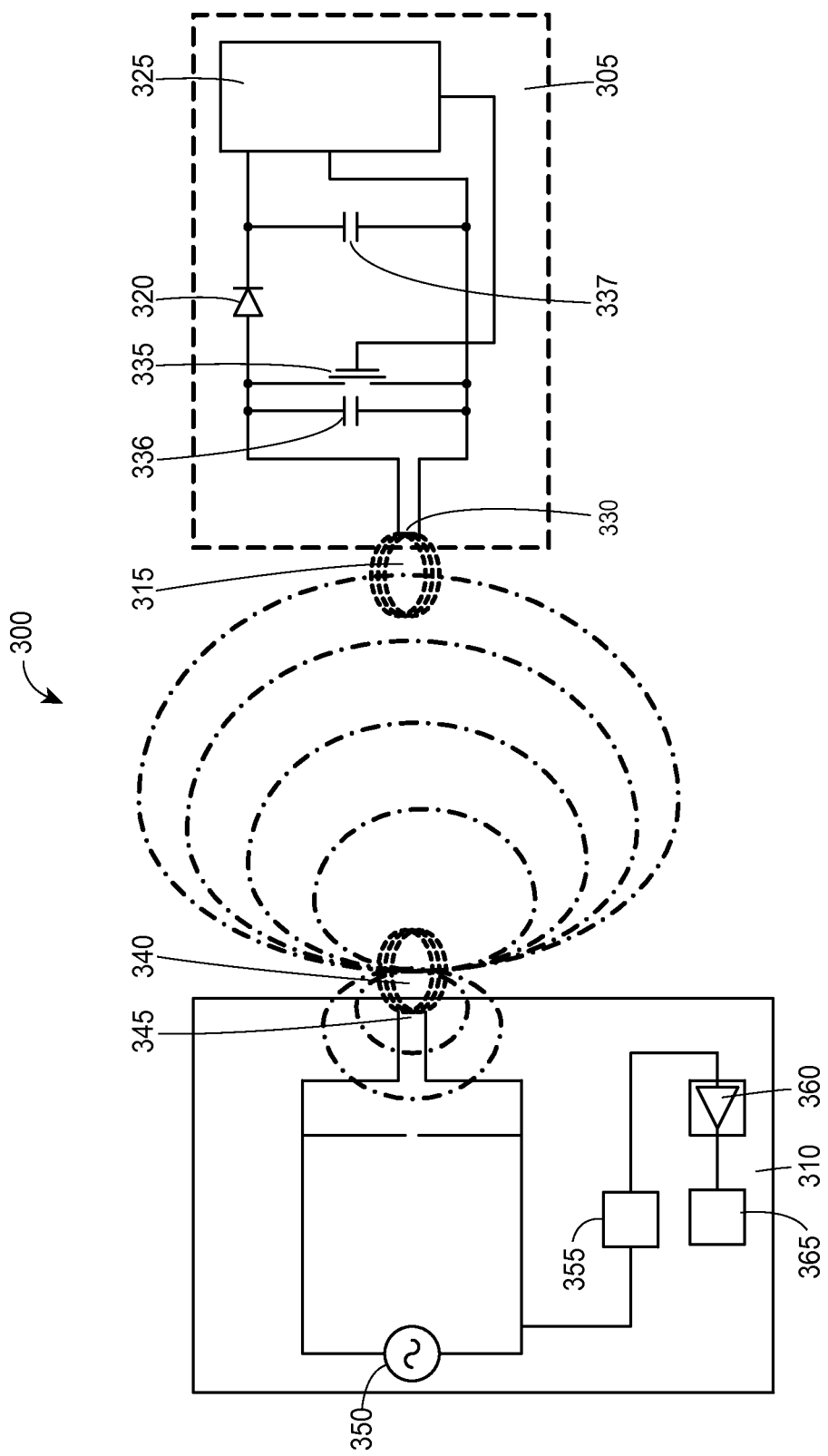
FIG. 3 depicts a block diagram of a near field communications or RFID assembly.

Turning now to FIG. 3 there is shown a NFC system 300. The NFC system includes a transponder 305 and a reader 310. The transponder is configured to respond to a received magnetic field 315. The transponder includes: a diode 320, an integrated circuit 325, transponder antenna 330, a load modulator 335, a first capacitor 336 and a second capacitor 337. The reader is configured as a source for an emitted magnetic field 340. The reader includes a reader antenna 345, a power supply 350, a backscatter period detector 355, a rectifier 360 and a demodulator 365. When a resonant transponder is placed within the magnetic alternating field of the reader's antenna (i.e. the self-resonant frequency of the transponder corresponds with the transmission frequency of the reader), the transponder draws energy from the magnetic field. Power consumption is measured as voltage drop at the internal resistance in the reader antenna and through the supply current to the reader's antenna. Switching on and off of a load resistance at the transponder's antenna therefore effects voltage changes at the reader's antenna and thus has the effect of an amplitude modulation of the antenna voltage by the transponder. When switching on and off of the load resistor is controlled by data, the data is transferred from the transponder to the reader. This type of data transfer is referred to as load modulation. To reclaim the data in the reader, the voltage measured at the reader's antenna is rectified. This corresponds to the demodulation of an amplitude modulated signal.

The RFID transponder contains at least two primary components. One component is an integrated circuit for storing and processing information, modulating and demodulating a radio-frequency (RF) signal, and other specialized functions. The second primary component is an antenna for receiving and transmitting a reflected signal.

Passive RFID transponders may use near field magnetic flux from readers to power microprocessors that can read from or write to a memory included within the transponder. Semi-passive transponders use a battery to power a corresponding microprocessor to extend the read range. In either case, RFID transponders do not broadcast signals, but instead the transponders alter signals from a RFID reader to establish wireless communications. This provides substantial power savings and is directly applicable to field devices where power budgets play a substantial role in the design of a device. By integrating a RFID transponder into an asset data module in accordance with one or more exemplary forms outlined herein, a wireless link may be provided with minimal power. Any given RFID transponder may include a serial peripheral interface (SPI) bus, as available from IDS Microchip, AG SL13A or Atmel AT88RF001, to communicate with a memory or an associated processor.

The SPI bus is a synchronous serial data link standard that operates in full duplex mode. Devices communicate in master/slave mode where the master device initiates a data frame. Multiple slave devices may be accommodated with individual slave select lines.

In accordance with one or more exemplary aspects, by incorporating an RFID module 240 into an asset data module, access to asset data is provided without having to remove a terminal cap to establish communications. This is particularly advantageous as many process plants have a no touch policy when a valve, for example, is on line (i.e., they do not want to risk shorting the terminals and bringing a valve down). In addition, by directly communicating with a processor or a memory, a NFC interface is protocol independent (i.e. the same interface may be used to communicate with HART, FF and PROFIBUS devices). Thereby, a common reader may be utilized with field devices having different protocols.

A RFID module may function as a local data historian. Data related to an associated asset is collected within a memory incorporated within a transponder and downloaded as desired using an NFC reader. A processor in a RFID module executes an asset data routine that populates a memory in the corresponding RFID integrated circuit with various data. Diagnostic data may be exchanged between a NFC transponder and a NFC reader in one sequential communication.

A contact memory button (CMB) may be configured such that the associated electronic components are fully enclose. Touch Memory (or contact memory) is an electronic identification device packaged in a coin-shaped stainless steel container. This is especially useful when touch is not at issue. Contact memory buttons have a wire bus that allows use of an explosion proof housing around the associated processor and memory. Touch memory is accessed when a touch probe comes into contact with a memory button. Read and/or write operations between the probe and memory chip are performed with just a momentary contact. Thousands of reads and writes may be performed with a single chip and data integrity often lasts over one hundred years. Touch memory complements such technologies as bar codes, RFID transponders, magnetic stripe, proximity cards and smart cards. Unlike bar codes and magnetic swipe cards, many touch memory solutions can be written to as well as being read.

Communication rate, and product breadth, of touch memory goes well beyond the simple memory products typically available with RFID. CMBs may be passive and provide read/write electronic data storage. Commonly available CMBs hold up to 4 GBytes of data. Some CMBs are designed for extreme temperatures, radiation, ESD, EMI, EMP, shock, and vibration. This is particularly useful in plants where hazardous materials are processed. CMBs provide intrinsically safe, single wire communications. CMBs are typically housed in a metal enclosure. With a battery included, a semi-passive or active CMB may be configured as a data logger.

NFC and Bluetooth are both short-range communication technologies which may be incorporated within an asset in accordance with the present disclosure. As described in detail below, NFC operates at slower speeds than Bluetooth, but consumes far less power and does not require pairing.

NFC sets up faster than standard Bluetooth, but is not much faster than Bluetooth low energy. The connection between two NFC devices is automatically established quickly, in less than a tenth of a second. The maximum data transfer rate of NFC (424 kbit/s) is slower than that of Bluetooth V2.1 (2.1 Mbit/s). With a maximum working distance of less than 20 cm, NFC has a shorter range, which reduces the likelihood of unwanted interception. That makes NFC particularly suitable for crowded areas, such as processing facilities having several assets within close proximity of one another, where correlating a signal with its transmitting physical device (and by extension, its user) becomes difficult.

In contrast to Bluetooth, NFC is compatible with existing passive RFID (13.56 MHz ISO/IEC 18000-3) infrastructures. NFC requires comparatively low power, similar to the Bluetooth V4.0 low energy protocol. A RFID-NFC communications system is configured for reading and/or writing device parameters. An NFC reader may be incorporated with a Bluetooth repeater. In this manner, a cover may be placed over the RFID module on the corresponding asset and a Bluetooth signal is sent to a remote reader.

Table 1 depicts an example of original asset data that may be acquired from the original equipment manufacturer or another source. The asset identification, the module and serial numbers may be direct entries. While the corresponding specifications, installation manual, maintenance manual and operations manuals may be made available via a hyperlink to a .pdf file, for example. This data may be stored in a memory provided within a corresponding near field communications interface; a computer readable media, a memory of a corresponding asset data module, any sub-combination or combination thereof. In at least one embodiment, a near field communications transponder is provided to exchange the original asset data with a corresponding NFC reader. It should be understood that any given original asset data table may include more or less entries depending on whether related field device information may be included.

Table 2 depicts an example of configuration data that may be made available. This asset configuration data may be stored in a memory provided within a corresponding NFC interface; a computer readable media, a memory of a corresponding asset data module, any sub-combination or combination thereof. A near field communications transponder is provided to exchange the asset configuration data with a corresponding NFC reader. It should be understood that any given configuration data table may include more or less entries depending on whether related field device information may be included.

TABLE 2

| ASSET ID | OPEN LIMIT | CLOSE LIMIT | INPUT VARIABLE | OUTPUT VARIABLE | SCALING FACTOR |
|---|---|---|---|---|---|
| ABC123 | | | | | |

Table 2 depicts an example of configuration data that may be made available. This asset configuration data may be stored in a memory provided within a corresponding NFC interface; a computer readable media, a memory of a corresponding asset data module, any sub-combination or combination thereof. A NFC transponder is provided to exchange the asset operations data with a corresponding NFC reader. It should be understood that any given asset operations data table may include more or less entries depending on whether related field device information may be included.

TABLE 3

| ASSET ID | HOURS OPERATING | FAULT | HOURS AT 75% | HOURS AT 100% |
|---|---|---|---|---|
| ABC123 | | | | |

Table 4 depicts various information related to asset maintenance data. This asset maintenance data may be stored in a memory provided within a corresponding NFC interface; a computer readable media, a memory of a corresponding asset data module, any sub-combination or combination thereof. A NFC transponder is provided to exchange the asset maintenance data with a corresponding NFC reader. It should be understood that any given asset maintenance data table may include more or less entries depending on whether related field device information may be included.

TABLE 4

| ASSET ID | DATE/ TIME | HOURS SINCE LAST MAINT. | NEXT SCHEDULED MAINTENANCE | MAINTENANCE PERFORMED |
|---|---|---|---|---|
| ABC123 | | | | |

Figure 4:
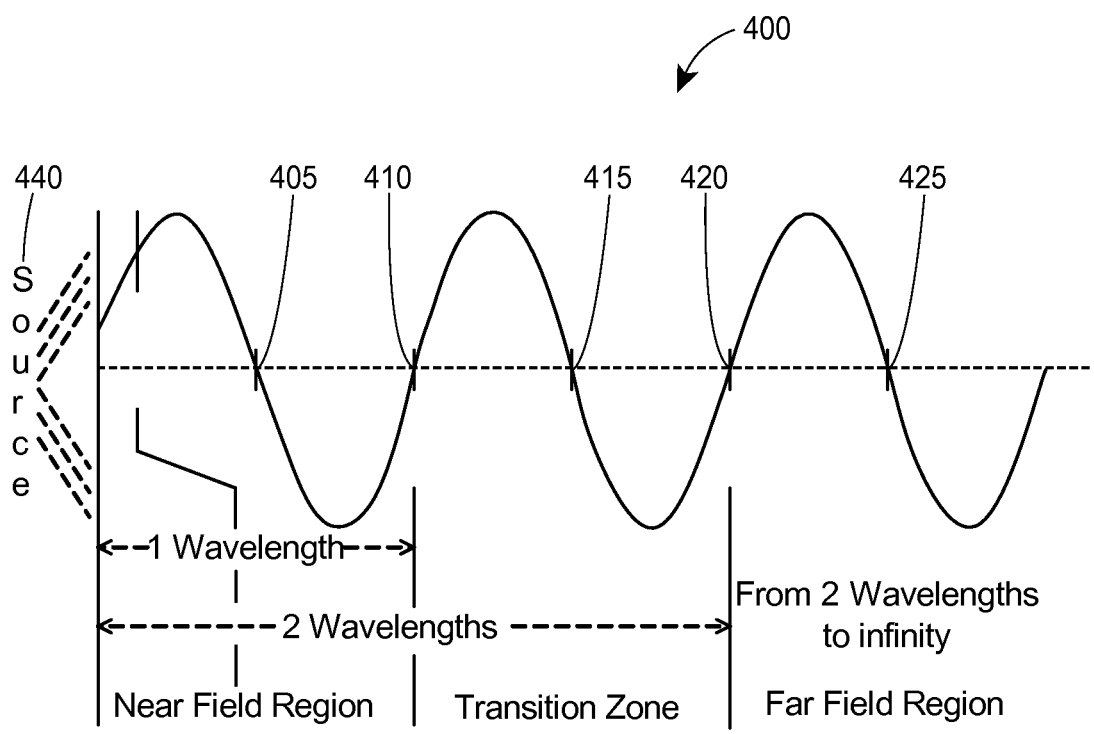
FIG. 4 depicts a frequency graph related to radio frequency designations.

With reference to FIG. 4 a frequency graph 400 depicts a radio frequency source 440 along with a half-wave 405, full-wave 410, a one-and-one-half-wave 415, two-wave 420 and beyond two-wave to infinity periods. As can be seen, the

TABLE 1

| ASSET ID | MODEL | SERIAL # | SPECIFICATIONS | INSTALLATION MANUAL | MAINTENANCE MANUAL | OPERATIONS MANUAL |
|---|---|---|---|---|---|---|
| ABC123 | A1B2C3 | 123ABC | "LINK" | "LINK" | "LINK" | "LINK" | one-wavelength interval correlates to a near field region, the interval from one-wave to two-wave correlates to a transition zone and beyond two-wave correlates to a far field region. It should be understood that a either a wireless communications system in accordance with the present disclosure may employ a near field communications system, a far field communications system or a combination thereof.

A RFID may be configured as a remote databases configured as an integral part of a given asset. A corresponding asset may be tracked on a real-time location system (RTLS) used to locate equipment, tools, and critical equipment in a facility. A near field communications system may be configured to provide peer-to-peer communications.

An associated near field communications system associated memory contains: manufacturer, place of manufacturer, serial, unit identifier, last service date. In at least one embodiment, an internet connection is utilized to tie asset data to a remote database. An iPhone application, for example, may be configured to provide remote access to asset data.

Up to 3,600 samples may be logged with sample rates 1 min. to 5 days. A near field communications transponder may be used to track temperature sensitive products to make sure the product temperature never got out of range at any time during production or transportation.

Competitive parts management and web based parts management is enhanced utilizing NFC transponders integral to major assets. A near field communications transponder is utilized to streamlined parts identification and provide frictionless purchases. A database (i.e., as supplied by Oracle, or the like) may be employed along with a NFC interface for streamlining a related parts business. RFID may be employed as a mechanism to encrypt parts data. A NFC system may be configured to provide a secure key for 3G/Wi-Fi transactions. Linking NFC using 3G provides a mechanism of leveraging a corporation's database investment.

A local database for keeping device records up to date employs a near field communications interface. This configuration assists customers to maintain equipment records. A NFC system may be provided for storing maintenance history, inspection history, and calibration history of assets. A NFC system may also be used for equipment checks and audits, such as for example, to get bolt torques, lubrication requirements, etc. A NFC system may, for example, be used in remote locations where access to databases or records is limited (e.g., oil patch). A NFC system may provide a physical link for paperwork to the device itself, such as for example, provide a record of post weld heat treat times. A passive NFC system may be configured to provide a zero power wireless link to an associated processor, or processors. A NFC system may be employed to retrieve, for example, instrument state variables (ref, tvl, press), alerts, and/or device information (FW rev., S/N, last calibration date).

A semi-passive (i.e. the associated asset data module provides a power source) NFC system may be configured as a data historian. A NFC interface may be configured to provide interface for detached field devices. Plant-wide, networked infrastructure is not required with NFC systems. A NFC system may be used to identify counterfeit or unapproved parts. A NFC system is employed to match an auxiliary part to a valve assembly and may be used to manage parts on large construction projects. A NFC system may be configured as a replacement for licensing dongles where no USB connections are available. A NFC system may provide temporary secure memory for assets. A NFC system assists in finding parts quickly in a boneyard, staging area, or in inventory. Asset records get out of synchronization, a NFC system may be used to scan parts bins or pallets to find parts. RFID can see through cardboard shipping containers, therefore, there is no need to unpack assets for inspection. Employees may be tracked throughout a plant with RFID systems and used to locate employees in hazardous areas.

Upon reading this disclosure, those of skill in the art will appreciate still additional alternative structural and functional designs for a system and a process for tracking asset related data. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A communication system for use with a control system of a process plant, the communications system comprising:
   at least one process plant asset;
   an asset data module operatively coupled to the asset, the asset data module comprising a processor, a memory operatively coupled to the processor, and at least one input and at least one output operatively coupled to the memory;
   the memory arranged to store original asset data, the memory further arranged to receive operational data associated with the asset via the input while the asset is in service within the process plant;
   a control module and configuration data stored on the memory and executable by the processor, the control module arranged to provide a control instruction to the asset and to monitor the operational data based on the configuration data, wherein the configuration data is automatically communicated with associated asset data modules of other assets to simplify installation and reduce errors that may occur due to inaccurate configuration;
   a near field communications interface configured to retrieve the original asset data and the operational data from the memory, the near field communications interface further configured to access the original asset data and the operational data whether the asset is in service or out of service; and
   the near field communications interface configured to communicate with a reader to communicate the original asset data and the operational data to the reader to permit communication of the original asset data and operational data to the control system of the process plant.

2. A communication system as in claim 1 wherein said near field communications interface is configured to provide data exchange with said integral processor.

3. A communication system as in claim 1 wherein said control module is configured to cause an asset to control a process related function.

4. A communication system as in claim 1 wherein said asset data module is configured for monitoring a process related function to acquire asset operational data.

5. A communication system as in claim 1 further including a far field communications interface operatively coupled to the asset data module.

6. A communication system as in claim 5 wherein a first communication protocol associated with the near field communications interface is independent from a second communication protocol associated with the far field communications interface.

7. An asset data module for use with a process plant asset, the asset data module comprising:
   an integral processor operatively coupled to at least one input and at least one output;

an integral memory operatively coupled to the processor, the input, and the output, the memory arranged to store original asset data, the memory further arranged to receive operational data associated with the asset via the input while the asset is in service within a process plant;

a control module and configuration data stored on the memory and executable by the processor, the control module arranged to provide a control instruction to the asset and to monitor the operational data based on the configuration data, wherein the configuration data is automatically communicated with associated asset data modules of other assets to simplify installation and reduce errors that may occur due to inaccurate configuration;

a near field communications interface configured to retrieve the original asset data and the operational data from the memory, the near field communications interface further configured to access the original asset data and the operational data whether the asset is in service or out of service; and the near field communications interface configured to communicate with a near field communications reader to permit communication of the original asset data and the operational data to a user.

8. An asset data module as in claim 7 wherein said near field communications interface is configured to provide data exchange between the near field communications reader and said integral processor.

9. An asset data module as in claim 7 wherein said control module is configured to cause an asset to control a process related function.

10. An asset data module as in claim 7 wherein said asset data module is configured for monitoring a process related function to acquire asset operational data.

11. An asset data module as in claim 7 further comprising a far field communications interface.

12. An asset data module as in claim 11 wherein a first protocol associated with the near field communications interface is independent from a second protocol associated with the far field communications interface.

13. An asset data module for use with an asset of a process plant, comprising:
　an integral processor, wherein said integral processor is operatively coupled to at least one input and at least one output, the input arranged to receive operational data associated with a process plant operation;
　a control module and configuration data stored on the memory and executable by the processor, the control module arranged to provide a control instruction to the asset and to monitor the operational data based on the configuration data, wherein the configuration data is automatically communicated with associated asset data modules of other assets to simplify installation and reduce errors that may occur due to inaccurate configuration;
　an integral memory arranged to store original asset data, the memory further arranged to receive the operational data via the input while the asset is in service within the process plant; and
　the processor arranged to execute the control module to provide a control instruction to the asset and to monitor the operational data;
　a near field communications interface configured to provide access to said original asset data and said operational data stored within said memory to permit access to the original asset data and the operational data by a user.

14. An asset data module as in claim 13 wherein said control module is configured to cause an asset to control a process related function.

15. An asset data module as in claim 13 wherein said asset data module is configured for monitoring a process related function to acquire asset operational data.

16. An asset data module as in claim 13 wherein said near field communications interface is passive.

17. An asset data module as in claim 13 said near field communications interface comprising battery assist power.

18. An asset data module as in claim 13 wherein said near field communications interface is active.

19. An asset data module as in claim 13 further comprising a far field communications interface.

20. An asset data module as in claim 19 wherein a first protocol associated with the near field communications interface is independent from a second protocol associated with the far field communications interface.

21. A method of communicating process plant asset data related to an asset data module with a process plant digital automation system, comprising:
　providing an integral processor operatively coupled to at least one input and at least one output;
　providing an integral memory operatively coupled to the processor;
　storing original asset data in the memory;
　providing, while the asset is in service within the process plant, operational data associated with process plant operations to the input for storage in the memory;
　storing a control module and configuration data on the memory for execution by the processor, the control module arranged to provide a control instruction to the asset and to monitor the operational data based on the configuration data, wherein the configuration data is automatically communicated with associated asset data modules of other assets to simplify installation and reduce errors that may occur due to inaccurate configuration;
　storing an asset data access routine within a memory; and
　providing a near field communications interface configured to provide access to the original asset data and the asset operational data stored within the memory when the asset data access routine is executed.

22. A method of communicating process plant asset data related to an asset data module with a process plant digital automation system as in claim 21 wherein said control module is configured to cause an asset to control a process related function.

23. A method of communicating process plant asset data related to an asset data module with a process plant digital automation system as in claim 21 wherein said asset data module is configured for monitoring a process related function to acquire asset operational data.

24. A method of communicating process plant asset data related to an asset data module with a process plant digital automation system as in claim 21 wherein said near field communications interface is passive.

25. A method of communicating process plant asset data related to an asset data module with a process plant digital automation system as in claim 21 said near field communications interface comprising battery assist power.

26. A method of communicating process plant asset data related to an asset data module with a process plant digital automation system as in claim 21 wherein said near field communications interface is active.

27. A method of communicating process plant asset data related to an asset data module with a process plant digital automation system as in claim 21 further comprising a far field communications interface.

28. A method of communicating process plant asset data related to an asset data module with a process plant digital automation system as in claim 27 wherein a first protocol associated with the near field communications interface is independent from a second protocol associated with the far field communications interface.

* * * * *